US008923802B2

(12) United States Patent
Bourdu et al.

(10) Patent No.: US 8,923,802 B2
(45) Date of Patent: *Dec. 30, 2014

(54) HOME NETWORK ROAMING MANAGEMENT FOR ECALL-ONLY SUBSCRIBERS

(75) Inventors: Jean-Baptiste Bertrand Bourdu, South Lake Tahoe, CA (US); David Hugh Williams, Malaga (ES); Nikolai Konrad Leung, Takoma Par, MD (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/283,970

(22) Filed: Oct. 28, 2011

(65) Prior Publication Data
US 2012/0289179 A1 Nov. 15, 2012

Related U.S. Application Data

(60) Provisional application No. 61/485,082, filed on May 11, 2011.

(51) Int. Cl.
*H04M 11/04* (2006.01)
*H04W 76/00* (2009.01)
*H04W 4/04* (2009.01)
*H04W 4/22* (2009.01)
*H04W 60/00* (2009.01)

(52) U.S. Cl.
CPC ............ *H04W 76/007* (2013.01); *H04W 4/046* (2013.01); *H04W 4/22* (2013.01); *H04W 60/00* (2013.01)
USPC .................. 455/404.1; 455/432.1; 455/435.1; 455/434; 455/569.1; 370/338

(58) Field of Classification Search
CPC ......... H04W 4/22; H04W 8/04; H04W 4/001; H04W 4/046; H04W 48/18; H04W 8/18; H04W 68/12
USPC .......... 455/404.1–404.2, 426.1, 432.1–435.3, 455/569.1, 569.2
See application file for complete search history.

(56) References Cited

U.S. PATENT DOCUMENTS 6,310,543 B1 * 10/2001 Yoshioka et al. ............. 340/436
6,574,463 B1 * 6/2003 Yoshioka ................... 455/404.2
(Continued)

FOREIGN PATENT DOCUMENTS

GB        2440576 A      2/2008
WO    WO-2007126100 A1   11/2007
(Continued)

OTHER PUBLICATIONS

3rd Generation Partnership Project; Technical Specification Group Services and System Aspects; Service aspects; Service principles (Release 11), 3GPP Standard; 3GPP TS 22.101, 3rd Generation Partnership Project (3GPP), Mobile Competence Centre ; 650, Route Des Lucioles ; F-06921 Sophia-Antipolis Cedex ; France, No. V11. 1.0, Apr. 1, 2011, pp. 1-60, XP050476746, [retrieved on Apr. 1, 2011]

(Continued)

*Primary Examiner* — Sharad Rampuria
(74) *Attorney, Agent, or Firm* — Austin Rapp & Hardman (57) ABSTRACT

A Home Public Land Mobile Network (HPLMN) or home network immediately accepts a registration requests from "eCall-only" subscribers attempting to register with any Visitor Public Land Mobile Networks (VPLMNs) or roaming network. This avoids unnecessary delays in the establishment of an eCall (emergency call) that might be otherwise introduced by the home network's roaming registration management policy (RRMP) that otherwise would only permit registrations (and subsequent call servicing) by preferred roaming VPLMN partners and automatically reject registrations from non-preferred roaming networks (which may hinder or prevent timely completion of an eCall).

36 Claims, 5 Drawing Sheets

(56) References Cited

U.S. PATENT DOCUMENTS

| | | | |
|---|---|---|---|
| 8,265,022 B2 * | 9/2012 | Hans | 370/329 |
| 8,417,212 B2 * | 4/2013 | Cepuran et al. | 455/404.1 |
| 8,600,339 B2 * | 12/2013 | Bourdu et al. | 455/404.1 |
| 2006/0229014 A1 * | 10/2006 | Harada et al. | 455/41.2 |
| 2009/0253403 A1 * | 10/2009 | Edge et al. | 455/404.2 |
| 2010/0317314 A1 | 12/2010 | Roland | |
| 2011/0039559 A1 | 2/2011 | Yi et al. | |
| 2011/0112969 A1 * | 5/2011 | Zaid et al. | 705/50 |

FOREIGN PATENT DOCUMENTS

| | | | | |
|---|---|---|---|---|
| WO | WO-2009124131 A2 | 10/2009 | | |
| WO | WO2010/007412 | * | 1/2010 | H04W 4/22 |
| WO | WO2010007412 A1 | 1/2010 | | |

OTHER PUBLICATIONS

International Search Report and Written Opinion—PCT/US2012/029832—ISA/EPO—Jun. 4, 2012.

* cited by examiner

HOME NETWORK ROAMING MANAGEMENT FOR ECALL-ONLY SUBSCRIBERS

CLAIM OF PRIORITY UNDER 35 U.S.C. §119

The present Application for Patent claims priority to Provisional Application No. 61/485,082, filed on May 11, 2011, and assigned to the assignee hereof and hereby expressly incorporated by reference herein.

BACKGROUND eCall refers to an in-vehicle emergency call service. In the event of a collision involving the vehicle, the eCall In-Vehicle System (IVS) establishes an emergency call via a mobile network to emergency agencies. The IVS can be provisioned for "eCall-only" service or for "mixed-mode eCall" service. In mixed-mode eCall service, the system can be used to perform emergency eCalls as well as non-emergency, subscription-based calls. In eCall-only mode, however, the system can only be activated to make emergency calls, and an IVS in eCall-only mode does not register on the mobile network before the eCall is triggered. Thus, when an eCall emergency is triggered, two operations must be performed: (1) the IVS must first register on an available mobile network, and then (2) the IVS initiates the eCall emergency call. Conventionally, registration of the IVS on the mobile network to place an eCall is performed similar to registration for non-emergency calls.

When the IVS is "roaming" and its Home Public Land Mobile Network (HPLMN) or "home network" is unavailable, the IVS must register on a Visitor Public Land Mobile Networks (VPLMNs) or "roaming network" if one is available. Before a roaming network can register the IVS, however, it must receive permission from the IVS's home network. However, it is not uncommon for such permission to be denied, especially in typical instances where the home network has a roaming registration management policy (RRMP) that only permits registrations (and subsequent call servicing) by preferred VPLMN partners ("preferred partners") with whom the home network has established favorable business arrangements. Thus, in operation, the home network might automatically reject registrations from non-preferred roaming networks unless and until it receives and accepts a registration request through one of its preferred partners.

Consequently, to make an emergency call while roaming, an eCall-only IVS may have to attempt registering with several available roaming networks before one is finally accepted by the IVS's home network (if at all), and this may take several minutes to succeed (if ever). Thus, conventional roaming registration of the IVS on the mobile network may significantly delay the placing of the emergency call—a call that is critically important to successfully register as quickly as possible.

SUMMARY

Several implementations disclosed herein are directed to a home network (an HPLMN) that immediately accepts a registration requests from an eCall-only subscriber attempting to register with any roaming network (a VPLMN). For various implementations, the home network uses information it maintains about each of its subscribers in its Home Location Register (HLR) to identify eCall-only subscribers. The home network then uses this information to determine when a registration request through a roaming network is coming from an eCall-only subscriber and, if so, immediately accepts the registration with that roaming network to avoid unnecessary delays in the establishment of the eCall.

In certain implementations, the home network may store an indicator in the HLR that a particular subscriber is eCall-only, and then checks each roaming network registration request against the indicators in the HLR to determine if the request is from an eCall-only subscriber or not. In alternative implementations, the home network might instead maintain a quick-reference list of its eCall-only subscribers that can be quickly referenced to determine if a registration request is from an eCall-only subscriber (without needing to search the entire HLR) and approve or deny accordingly.

For other implementations, the home network might instead compile a list of eCall-only subscribers and then provide access to this list to roaming networks which, upon receipt of a registration request and identification of the caller's home network, can reference the home network's list and thereby determine if the caller is an eCall-only subscriber who is pre-approved for registration and, if so, immediately register the caller and service the emergency call. In yet other implementations, the home network might even 'push' this list of eCall-only subscribers to roaming networks to provide automatic 'pre-approval' to the roaming networks to immediately register any of its listed IVS eCall-only subscribers when a registration request is received.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

"112" is the principal emergency telephone number that can be dialed free of charge from any telephone or any mobile phone in the European Union (EU) in order to reach emergency services such as ambulance, firefighter, and police services. The GSM mobile phone standard also designates 112 as an emergency number so it will work on GSM phones everywhere including North America (where GSM systems redirect emergency calls to 911, the U.S. equivalent of 112) and Australia (where emergency calls are redirected to 000, the Australian equivalent of 112). "E112" is a location-enhanced version of 112 specifically designed for mobile phones where the location information for the caller is determined and transmitted to the emergency center (similar to the Enhanced 911 or "e911" system in the U.S.).

"eCall" refers to an interoperable in-vehicle emergency call service built on the E112 system operated in Europe. The purpose of eCall is to speed up emergency service response times to road accidents. In the event of a collision, accident, or emergency condition, eCall is used to automatically or manually establish an emergency voice call via the cellular network to the local emergency agencies, i.e., a Public-Safety Answering Point (PSAP). In addition to enabling two-way speech communication between the motorist and a PSAP operator, eCall also allows transfer of a data message from the In-Vehicle System (IVS) over the cellular network to the PSAP which is denoted an eCall Minimum Set of Data (MSD) which includes vehicle location information, a time stamp, the number of passengers, the Vehicle Identification Number (VIN), and other relevant information.

Figure 1:
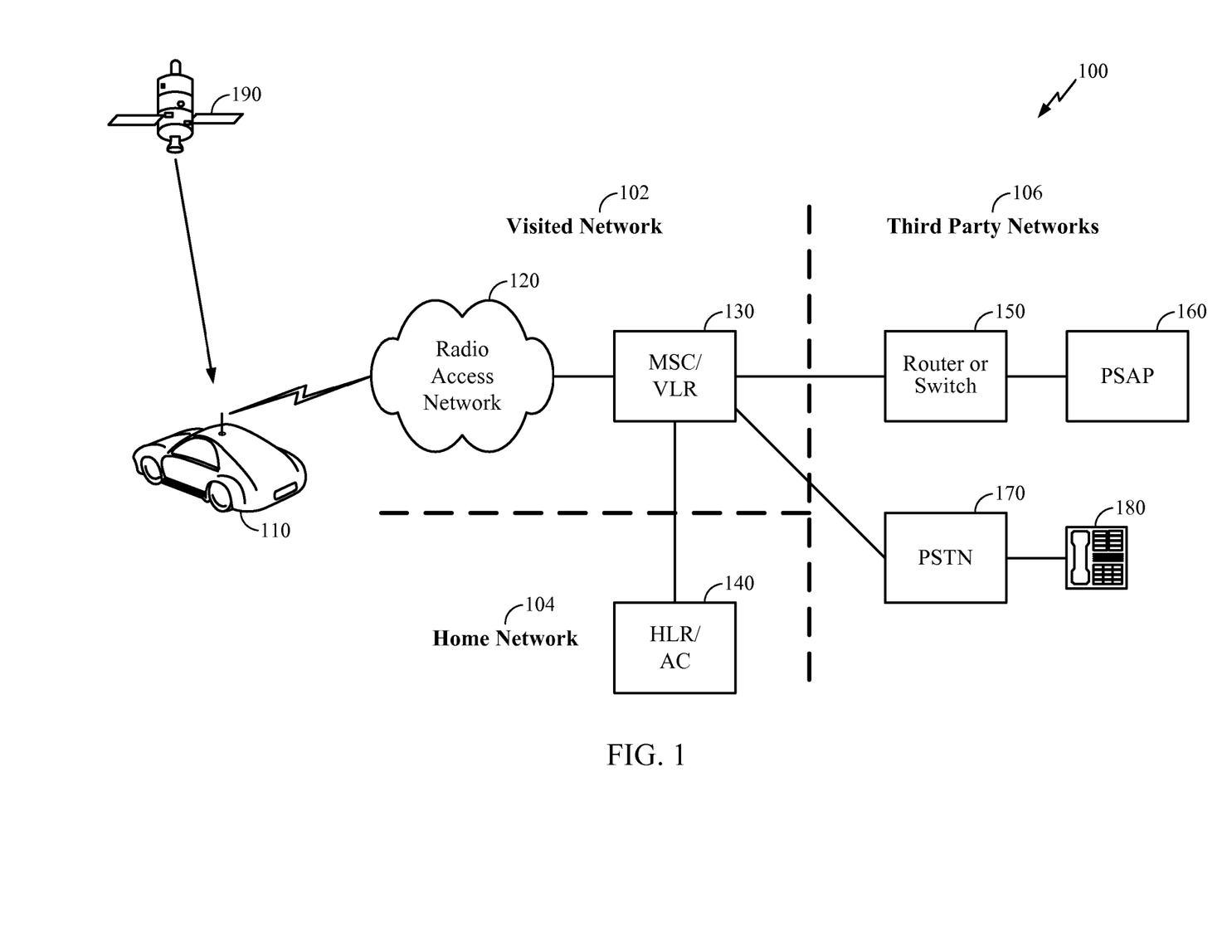
FIG. 1 is an illustration of an exemplary mobile communications network featuring an eCall emergency calling service.

FIG. 1 is an illustration of an exemplary mobile communications network 100 featuring an eCall emergency calling service. The mobile communications network 100 may include a roaming network (i.e., visited network) 102, a home network 104, and third party networks 106. As previously disclosed, the roaming network 102 may also be referred to as a Visited Public Land Mobile Network (VPLMN), a serving network, etc. Home network 104 may also be referred to as a Home Public Land Mobile Network (HPLMN). The roaming network 102 may be a serving network for an IVS 110 which may be roaming from its home network 104, as assumed in much of the description below. (In effect, the roaming network 102 and home network 104 may be the same network if the IVS 110 is not roaming.)

The roaming network 102 may include one or more base stations at the radio access network (RAN) 120, a Mobile Switching Center (MSC)/Visitor Location Register (VLR) 130, and other network entities not shown in FIG. 1 for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1X network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named "3rd Generation Partnership Project" (3GPP). CDMA 1X and HRPD are part of cdma2000, and cdma2000 and UMB are described in documents from an organization named "3rd Generation Partnership Project 2" (3GPP2). MSC 130 may perform switching functions for circuit-switched calls and may also route Short Message Service (SMS) messages. VLR 130 may store registration information for terminals that have registered with roaming network 102.

Home network 104 may include a Home Location Register (HLR)/Authentication Center (AC) 140 and other network entities not shown in FIG. 1 for simplicity. The HLR may store subscription information for terminals (including IVS 110) that have service subscription with home network 104. The AC may perform authentication for terminals (including IVS 110) having service subscription with home network 104.

Third party networks 106 may include a router or switch 150 (e.g., a PSAP selected router), a PSAP 160, a Public Switched Telephone Network (PSTN) 170, and possibly other network entities not shown in FIG. 1. Router or switch 150 may route calls between MSC 130 and PSAP 160. PSAP 160 may be responsible for answering emergency calls and may also be referred to as an Emergency Center (EC). PSAP 160 may be operated or owned by a government agency, e.g., a county or city. PSTN 170 may also provide telephone services for conventional wireline telephones, such as a telephone 180. Of course, FIG. 1 shows only some of the network entities that may be present in the roaming network 102 and the home network 104. For example, roaming network 102 may include network entities supporting packet-switched calls and other services, as well a location server to assist in obtaining terminal (i.e., IVS 110) location.

Generally, an IVS 110 is a dedicated in-vehicle system that may be permanently attached to or made part of a vehicle. The IVS 110, as a wireless communications terminal, may be also be thought of (and variously referred to as) a mobile station (MS) in GSM and CDMA 1X, a user equipment (UE) in WCDMA and LTE, an access terminal (AT) in HRPD, a SUPL enabled terminal (SET) in Secure User Plane Location (SUPL), a subscriber unit, a station, and so forth. The IVS 110 may also comprise or communicate with a personal navigation device (PND), and satellite signal reception, assistance data reception, and/or position-related processing may occurs at the IVS 110 or, alternately, at the PND. The IVS 110 may have a service subscription with home network 104 and may be roaming in roaming network 102, as shown in FIG. 1.

When activated, the IVS 110 may receive signals from RAN 120 in roaming network 102 and communicate with the RAN 120 to obtain communication services. The IVS 110 may also communicate with home network 104 for communication services when not roaming, although not shown in FIG. 1. The IVS 110 may also receive, via its PND (if present), signals from one or more satellites 190 which may be part of a satellite positioning system (SPS). As used herein an SPS may include any combination of one or more global and/or regional navigation satellite systems and/or augmentation systems, and SPS signals may include SPS, SPS-like, and/or other signals associated with such one or more SPS.

The IVS 110 may measure signals from satellites 190 and obtain pseudo-range measurements for the satellites. The IVS 110 may also measure signals from base stations in RAN 120 and obtain timing and/or signal strength measurements for the base stations. The pseudo-range measurements, timing measurements and/or signal strength measurements may be used to derive a position estimate and location information for the IVS 110.

An eCall may be different from a non-emergency call (non-eCall) in the manner in which the call is placed and the additional emergency related data that may be sent to establish the eCall and used to process the eCall. For example, the additional data may indicate how the eCall was initiated, a vehicle type and vehicle identification number (VIN), a timestamp, a location estimate (possibly with some kind of confidence rating), the direction of travel (if available), the number of passengers (e.g., number of fastened seatbelts if detectable), a trigger type (e.g., deployed airbags, bumper sensors, etc.), and possibly other information.

Dedicated eCall IVSs, known as "eCall-only" IVSs, are those IVSs associated with a vehicle and designed for the sole purpose of making emergency calls such as in the event of an accident. Such IVSs are generally said to operate in an "eCall-only mode." Generally, an eCall-only IVS differs from other eCall IVSs and conventional mobile communications devices (with or without eCall capabilities) in that the eCall-only IVS does not perform mobility management procedures (MMPs)—such as registration on a Public Land Mobile Network (PLMN)—except when the IVS is attempting to initiate an emergency call (or, in some instances, when the IVS is attempting to initiate a test or reconfiguration connection upon request of the user). Also, after registering and placing an emergency call, the eCall-only device may then be permitted to perform MMPs in order to allow call-back by the PSAP as well as normal voice and data communication functionality, SMS messaging, or other such wireless device capabilities for the duration of the emergency (or a suitably estimated period of time). Up until the moment an accident actually occurs, however, the eCall-only IVS is maintained in an inactive state.

In the event of an accident, an in-vehicle sensor may be triggered that activates the eCall-only IVS. Since this IVS was inactive prior to the accident, it is first necessary for the IVS to effect a connection (i.e., register) with an available network before it can transmit any data regarding the accident. Ideally this connection is made to the home network (HPLMN), but when the IVS is roaming (i.e., when the IVS's home network is unavailable or unreachable) the IVS must register on a roaming network (VPLMN) if one is available.

Figure 2:
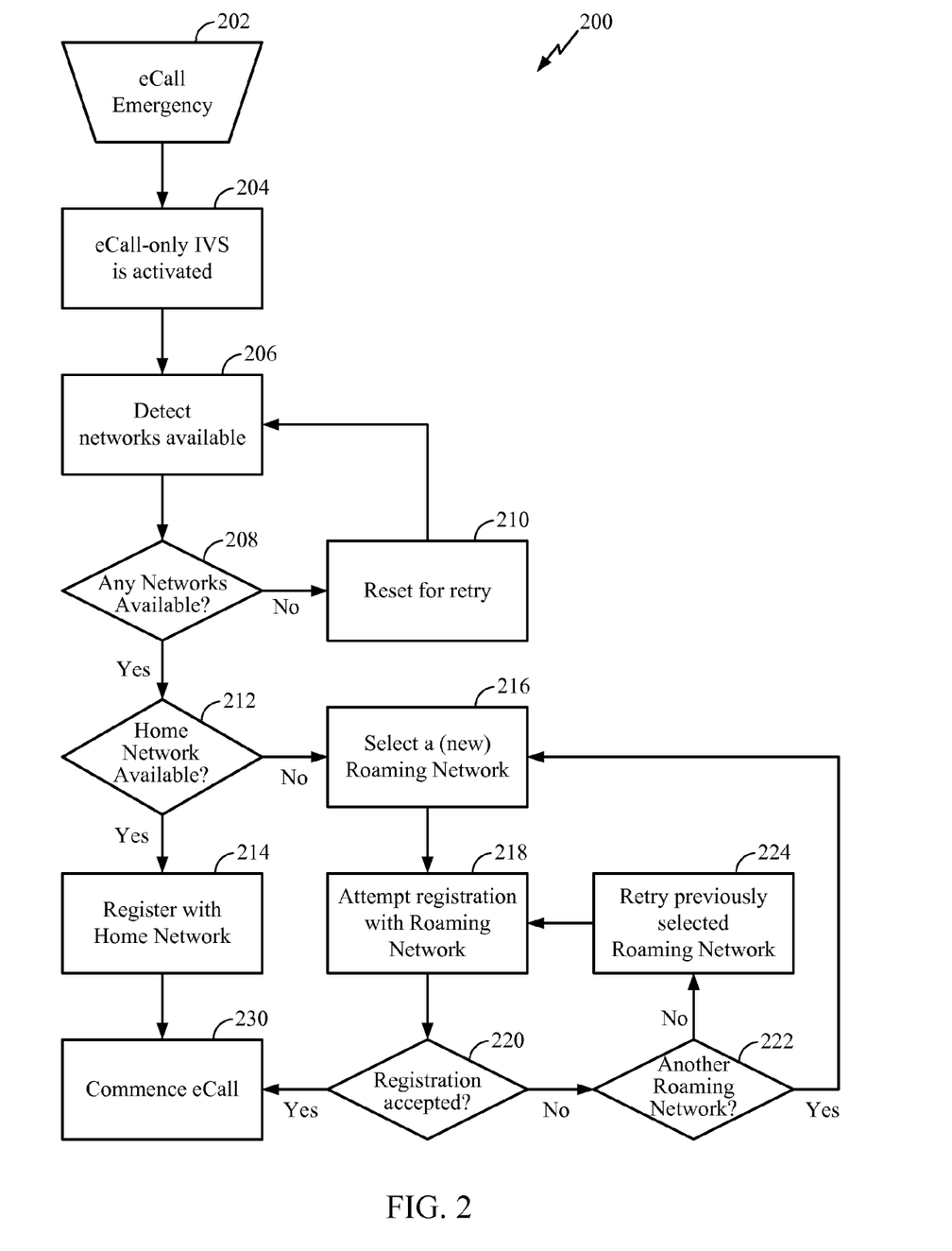
FIG. 2 is an operational flow diagram representative of the process for an eCall-only IVS to register and place an emergency call.

FIG. 2 is an operational flow diagram representative of a process 200 for an eCall-only IVS to register and place an emergency call. At 202, an eCall emergency call—for example, the deployment of the airbag in an accident or the press of an eCall button by the driver experiencing a medical emergency—activates, at 204, the eCall-only IVS. At 206, the IVS first detects if any networks are available, and if no networks are available as determined at 208, then at 210 the IVS resets and retries to detect at 206 again if any networks are available. When at least one network is available at 208, and at 210 if one of these available networks is the home network, then at 214 the IVS registers with the home network (which should only require one registration request) and then immediately commences the eCall at 230.

However, if the home network is not available at 212, then at 216 the IVS selects a roaming network from among the networks detected and, at 218, attempts to register with the roaming network. If the registration is accepted by the roaming network—which, as discussed later herein, is largely dependent on whether the roaming network is permitted to accept the registration by the IVS's home network—then the IVS can commence the eCall at 230. However, if the registration is rejected at 220, then if another roaming network is available at 222 the IVS can return to 216 and select this new roaming network and attempt to register with this new network at 218. If there is no other roaming network to select—such as when the IVS only detects one roaming network at 206—then at 224 the IVS retries to connect with the same roaming network with a new attempt at 218. The IVS may continue to attempt registration attempts with the available networks until the registration is successfully accepted by an available network. In certain implementations, and in addition to or in lieu of retrying to connect to the same roaming network, the IVS might attempt to place an emergency call without registering (i.e., in a "limited service state") which may be successful for networks where registration is not required to place an emergency call or otherwise.

With regard to 220, and before an available roaming network can register the IVS, the roaming network must first receive permission from the IVS's home network. There are several reasons for having to obtain this permission, not least among them being the common practice that requires the home network to pay the roaming network for registering and servicing the roaming call(s). Thus, it may be prudent for the home network to prefer certain networks over others and deny such permission to certain such roaming networks. To accomplish this, the home network may utilize a roaming registration management policy (RRMP) that only permits registrations (and subsequent call servicing) by the home network's preferred VPLMN partners ("preferred partners").

A home network's preferred partners might be those roaming networks with whom the home network has established favorable business arrangements for servicing roaming calls or, alternately, may include roaming networks known to have favorable pricing for servicing the home networks roaming calls. Thus, the home network may be well-incentivized to automatically reject registrations from non-preferred roaming networks and only accept registration requests through one of its preferred partners, effectively leaving its roaming subscribers (and their mobile communication devices, including IVSs) with the challenge of cycling through each of the available roaming networks until it finds one acceptable to the home network (if ever).

Consequently, to make an emergency call while roaming, an eCall-only IVS may have to attempt registering with several available roaming networks before one is finally accepted by the IVS's home network (if any), and this may take several minutes to succeed (if at all). For this reason, conventional roaming registration of the IVS on the mobile network may significantly delay or completely prevent the placing of an emergency call, and in the case of serious accidents any delay may significantly impair the provision of timely emergency care for accident victims, for example.

Figure 3:
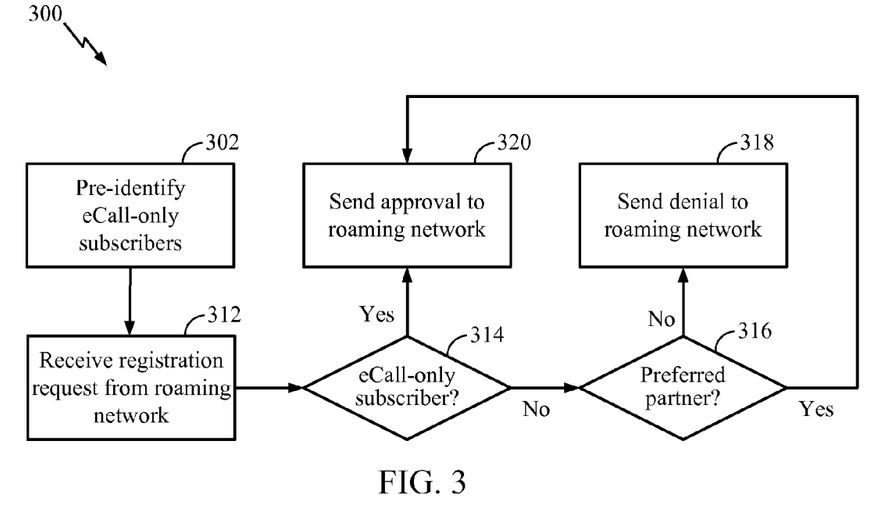
FIG. 3 is a process flow diagram of a method, representative of several implementations disclosed herein, wherein the home network immediately accepts a registration requests from an eCall-only subscriber attempting to register with any roaming network.

FIG. 3 is a process flow diagram of a method 300, representative of several implementations disclosed herein, wherein the home network immediately accepts (i.e., does not decline) a registration request from an eCall-only subscriber attempting to register with a roaming network even if the roaming network is not a preferred partner. For certain implementations, at 302, the home network may "pre-identify" eCall-only subscribers. Since the home network maintains information about each of its subscribers in its Home Location Register (HLR), it can readily ascertain which subscribers are eCall-only subscribers and, thus, can also determine when a registration is coming from an eCall-only subscriber through a roaming network. With this information, the home network can then accept the registration, regardless of whether the roaming network is a preferred partner, in order to avoid introducing any delay in the establishment of the eCall.

At 312, the home network then receives a registration request from the roaming network and, if the request pertains to an eCall-only subscriber at 314, then the home network can immediately approve the registration without regard to its RRMP (roaming registration management policy) that might otherwise decline the registration request if made through a roaming network that is not a preferred partner. In certain implementations, the home network may store an indicator in the HLR that indicates whether a particular subscriber is eCall-only, and then references its HLR to determine if the registration request if for an eCall-only subscriber. In other implementations, the home network may maintain a separate list of eCall-only subscribers that can be quickly searched to determine if a registration request is for an eCall-only subscriber.

Of course, if the registration request is not from an eCall-only subscriber (a non-eCall) at 314, then at 316 the home network may determine if the request is being made through a preferred partner—if so, then at 320 the home network approves the request, and if not, then at 318 the registration request may be denied—according to the home network's RRMP.

In yet other implementations, the home network might be even more proactive and provide a listing of its eCall-only subscribers to roaming networks so that these roaming networks can then use this list as a sort of automatic "pre-approval" to register an IVS eCall-only subscriber when a registration request is received. For example, in certain such implementations, the home network might maintain a list of eCall-only subscribers on a home network server that is accessible by roaming networks, while for other implementations the home network might "push" the list to the roaming networks such that a copy of the list resides with each roaming network (and thus accessible without communicating with the home network). In these several implementations, these roaming networks, upon receipt of a registration request and identification of the caller's HPLMN, can immediately reference the list (either maintained on an accessible home network server, or maintained locally as a copy received from the home network) to determine if the caller is an eCall-only subscriber and, if listed and thus pre-approved for immediate registration, proceeds to register the IVS and service the emergency call.

Figure 4:
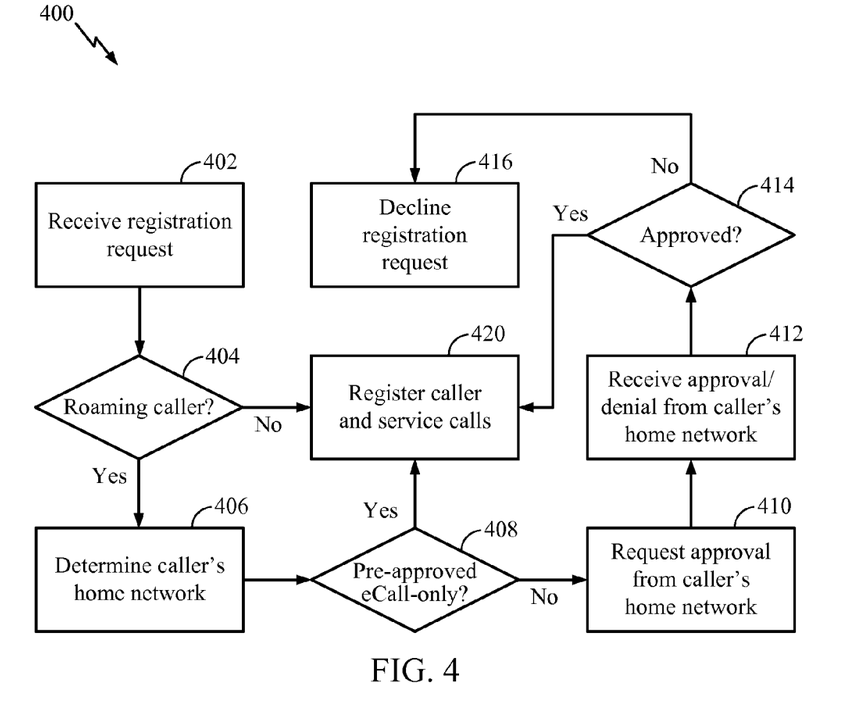
FIG. 4 is a process flow diagram of a method, representative of several implementations disclosed herein, for a first network to utilize a "pre-approved" list of a second network's eCall-only subscribers.

FIG. 4 is a process flow diagram of a method 400, representative of several implementations disclosed herein, for a first network to utilize a "pre-approved" list of a second network's eCall-only subscribers. At 402, the first network receives a registration request from a "caller" (a mobile communication device such as a mobile phone or an IVS) and, if the request is from one of its subscribers (i.e., is not a roaming caller) at 404, then at 420 the first network (which would be the home network relative to such a caller) registers the caller and services the call. However, if at 404 the first network determines that the request at 402 is from a roaming caller (and thus the first network is a roaming network relative to the caller), then at 406 the first network (as the roaming network) determines the caller's home network (a second network) and, at 408, references that second network's eCall-only subscriber list ("list") to discover if the caller is a pre-approved eCall-only subscriber of the second network and, if so, at 420 the first network (roaming network) registers the caller based on the pre-approval provided by the second network (home network). On the other hand, if at 408 the caller is not a pre-approved eCall-only subscriber of the second network, then the first network must request approval from that caller's home network (the second network) at 410, and receive an approval or denial from the second network at 412.

At 414 if the registration request is approved by the home network (the second network), then at 420 the first network (the roaming network) registers the caller and services the call. Conversely, if at 414 the registration request is denied by the home network (the second network), then at 416 the first network (the roaming network) declines the registration request and, in certain implementations, notifies the caller that the registration request is denied (which may be interpreted by the caller as a directive from its home network to try registering with another roaming network). Thus, with regard to 408, whether the caller is a pre-approved eCall-only subscriber of the second network may be determined, for example, by the first network by checking a list on a second network server in some implementations, and in other implementations by checking a copy of the list provided by the second network to the first network and maintained locally by the first network (as previously described).

For several embodiments, even when the roaming network uses a pre-approval to proceed with registering the caller, the roaming network might still forward the registration request to the home network (although not waiting for an approval from the home network) and, in some implementations, may include a flag or other indicator that it (the roaming network) determined that the caller was an eCall-only subscriber of the home network and was registered on the home-networks pre-approval (using a flag or an indicator bit of some kind when forwarding the registration request). This information may then be used by the home network to manage its pre-approval list, its eCall-only subscriber, and the emergency situation giving rise to the registration request accordingly.

Figure 5:
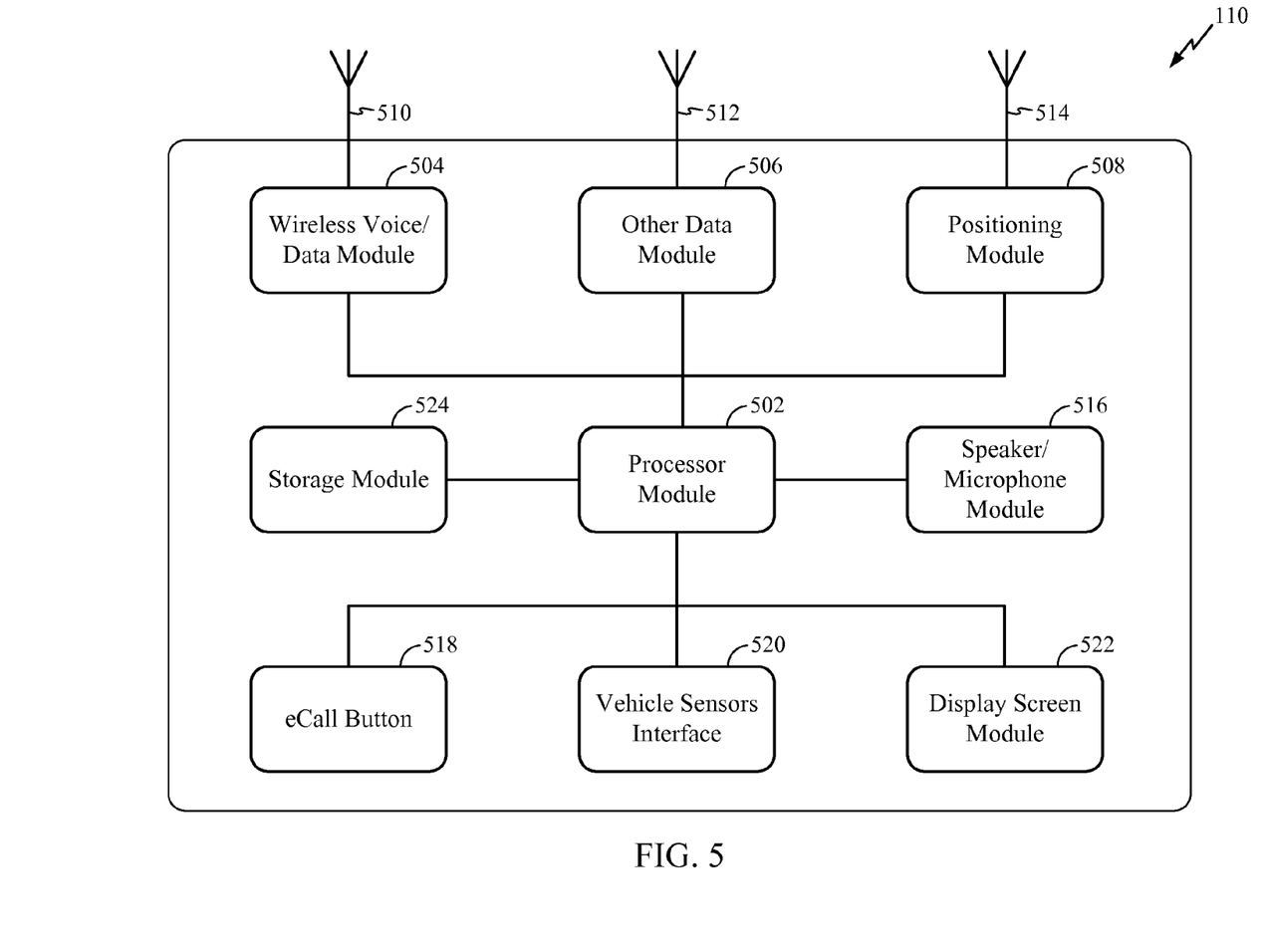
FIG. 5 is a block diagram of an exemplary In-Vehicle System (IVS) wireless device or apparatus that may be provisioned to operate as an eCall-only capable device illustrative of various implementations disclosed herein.

FIG. 5 is a block diagram of an exemplary IVS 110 wireless device or apparatus that may be provisioned to operate as an eCall-only capable device illustrative of various implementations disclosed herein. The IVS 110 may include a processor module 502 coupled to a plurality of wireless modules that enable the IVS 110 to communicate wirelessly. For example, the wireless modules may include a wireless voice/data module 504, an other data module 506 (e.g., Bluetooth module), and a positioning module 508 (e.g., GPS module), although the IVS 110 is not limited to the illustrated wireless modules. Each of the illustrated wireless modules is coupled to an antenna 510, 512 and 514, respectively. Although the antennas 510, 512 and 514 are shown as separate antennas, a single unitary antenna may also be used and coupled to the modules 504-508.

The processor module 502 may also be coupled to a speaker/microphone module 516, an eCall button 518, a vehicle sensors interface 520 and a display module 522. Furthermore, the processor module 502 may be coupled to a storage module 524 that may include information that provisions the IVS 110 as an eCall-only capable device. The eCall button 518 may be used to manually initiate an emergency call in the event of an accident or other situation requiring attention or assistance from emergency services. The vehicle sensors interface 520 may be coupled to sensors (not illustrated) deployed in a vehicle and designed to detect an accident condition that may require attention or assistance from emergency services. Such vehicle sensors may be attached to an airbag deployment mechanism, vehicle body integrity sensors, or the like.

The IVS 110 may be configured to transmit and receive voice and data communications to and from the MSC 130 via the RAN 120 during emergency calls (following registration). The MSC 130 enables emergency information from the IVS 110 to be communicated to the PSAP 160 via the router or switch 150 or the PSTN 170. Such emergency information may be communicated to the PSAP 160 once the IVS initiates an emergency call using the appropriate emergency number (e.g., 112, 911, 000, etc.) stored in the device. The emergency information may include voice communications directly from a user and via the speaker/microphone module 516, data generated from sensors coupled to the vehicle sensors interface 520, and positioning information from the positioning module 508.

As mentioned earlier, the IVS 110 may be provisioned as an eCall-only device, and such provisioning information may be stored in the storage module 524. The storage module 524 may be a nonvolatile storage, volatile storage, a Subscriber Identity Module (SIM), a Universal Subscriber Identity Module (USIM), or any other suitable storage capable element.

The speaker/microphone module 516 may be used during voice calls between the IVS 110 and the PSAP 160. Telematics application specific buttons, such as the eCall button 518, may be used to activate the eCall-only IVS or otherwise initiate the generation and transmittal of specific emergency data messages and/or emergency voice communications to the PSAP 160 via the eCall system. Furthermore, initiation of data communication may also be accomplished automatically via vehicle sensors, such as sensors coupled to the airbag deployment mechanism.

Each of the wireless modules 504-508 includes a transmitter to transmit and encode voice and data messages using antennas 510-514, respectively, via an over-the-air protocol such as CDMA, WCDMA, GSM, TDMA, or the like. The wireless modules 504-508 may also be configured to transmit by other wireless communications, such as satellite communications. Each of the wireless modules 504-508 also includes a receiver to receive and decode voice and data messages from the cell site 112, the MSC 130 and the PSAP 160, or any other component associated with the communications network 100. Such received voice and data messages may be received via an over-the-air protocol such as CDMA, WCDMA, GSM, TDMA, or the like. The wireless modules 504-508 may also be configured to receive other wireless communications, such as satellite communications. The transmitters and receivers may be integrated transceiver devices. These elements are discussed in more detail in FIG. 6.

Figure 6:
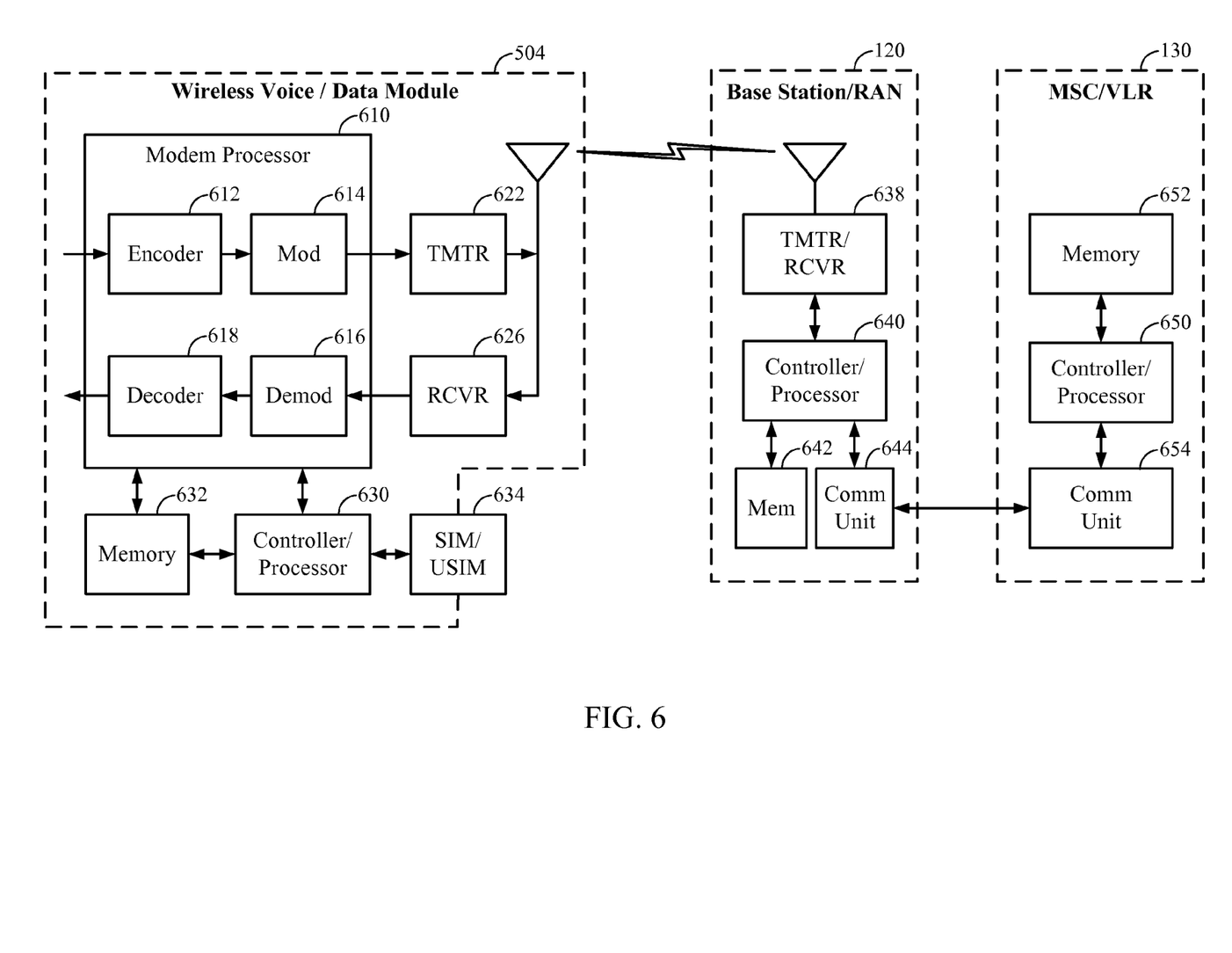
FIG. 6 is a block diagram of an exemplary wireless voice/data module of the IVS of FIG. 5 communicatively coupled to the base station/RAN and MSC/VLR of FIG. 1 during an emergency call (including MMPs related to same).

FIG. 6 is a block diagram of an exemplary wireless voice/data module 504 of the IVS 110 of FIG. 5 communicatively coupled to the RAN 120 and MSC/VLR 130 of FIG. 1 during an emergency call (including MMPs related to same). As illustrated in FIG. 6, when the IVS 110 is active during an emergency, an encoder 612 may receive data and messages to be sent by wireless voice/data module 504. Encoder 612 may process (e.g., encode and interleave) the data and messages and provide coded data and coded signaling. A modulator (Mod) 614 may further process (e.g., modulate, channelize, and scramble) the coded data and signaling and provide output samples. A transmitter (TMTR) 622 may condition (e.g., convert to analog, filter, amplify, and frequency upconvert) the output samples and generate an uplink signal, which may be transmitted to one or more base stations in RAN 120.

Wireless voice/data module 504 may also receive downlink signals transmitted by one or more base stations. A receiver (RCVR) 626 may condition (e.g., filter, amplify, frequency downconvert, and digitize) a received signal and provide input samples. A demodulator (Demod) 616 may process (e.g., descramble, channelize, and demodulate) the input samples and provide symbol estimates. A decoder 618 may process (e.g., deinterleave and decode) the symbol estimates and provide decoded data and messages sent to wireless voice/data module 504. Encoder 612, modulator 614, demodulator 616, and decoder 618 may be implemented by a modem processor 610. These units may perform processing in accordance with the radio technology (e.g., GSM, WCDMA, LTE, etc.) used by the wireless network with which wireless voice/data module 504 is in communication. A controller/processor 630 may direct the operation of various units at wireless voice/data module 504. Memory 632 may store program codes and data for wireless voice/data module 504. A SIM/USIM 634 may store subscription information for a service subscription used for wireless voice/data module 504.

At RAN 120, a transmitter/receiver 638 may support radio communication with IVS 110 wireless voice/data module 504 as well as other terminals (both IVSs and other mobile communication devices). A controller/processor 640 may perform various functions for communication with the terminals. For the uplink, the uplink signal from wireless voice/data module 504 may be received and conditioned by receiver 638 and further processed by controller/processor 640 to recover the data and messages sent by wireless voice/data module 504. For the downlink, data and messages may be processed by controller/processor 640 and conditioned by transmitter 638 to generate a downlink signal, which may be transmitted to wireless voice/data module 504 and other terminals. Memory 642 may store program codes and data for RAN 120. A communication (Comm) unit 644 may support communication with MSC/VLR 130 and other network entities.

At MSC/VLR 130, a controller/processor 650 may perform various functions to support communication services for the terminals. Memory 652 may store program codes and data for MSC/VLR 130. A communication unit 654 may support communication with RAN 120 and other network entities.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position/location determination techniques may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for establishing an emergency call in a mobile communications network, the method comprising:
   receiving a registration request at a roaming network that is not a home network for the registration request;
   determining if the registration request is from an eCall-only subscriber by referencing an eCall-only list provided by the home network, the eCall-only list equating to pre-approval for the roaming network to approve a registration request from a subscriber listed on the eCall-only list;
   if the registration request is from an eCall-only subscriber, then approving the registration request; and
   if the registration request is not from an eCall-only subscriber, then further processing the registration request to ascertain whether to approve or disapprove the registration request.

2. The method of claim 1, wherein the registration request is received from an in-vehicle system (IVS) via a roaming network.

3. The method of claim 1, wherein the receiving and determining are performed by a home network, and wherein the registration request is received via a roaming network.

4. The method of claim 3, wherein the determining comprises referencing a Home Location Register (HLR), wherein the HLR includes an indicator designating eCall-only subscribers.

5. The method of claim 3, wherein the determining comprises referencing an eCall-only list separate from a Home Location Register (HLR).

6. The method of claim 5, wherein the home network provides the eCall-only list on a server accessible by at least one roaming network, the eCall-only list equating to pre-approval to the at least one roaming network to approve a registration request from a subscriber listed on the eCall-only list.

7. The method of claim 5, wherein the home network pushes the eCall-only list to at least one roaming network, the eCall-only list equating to pre-approval to the at least one roaming network to approve a registration request from a subscriber listed on the eCall-only list.

8. The method of claim 1, wherein the receiving and determining are performed by a roaming network that is not a home network for the registration request.

9. The method of claim 8, wherein the determining comprises:
   identifying a home network for approving the registration request;
   forwarding the registration request to the home network; and
   receiving an indication from the home network that the registration request is approved or disapproved.

10. The method of claim 8, wherein the determining comprises referencing an eCall-only list provided by a home network, the eCall-only list equating to pre-approval for the roaming network to approve a registration request from a subscriber listed on the eCall-only list.

11. The method of claim 10, wherein the referencing comprises accessing a server on which the home network has provided information pertaining to the eCall-only list.

12. The method of claim 10, wherein the referencing comprises accepting from the home network information pertaining to the eCall-only list that has been pushed from the home network to the roaming network.

13. An apparatus for establishing an emergency call in a mobile communications network, the apparatus comprising:
a receiver for receiving a registration request; and
a processor for determining if the registration request is from an eCall-only subscriber and:
approving the registration request based on determining that the registration request is from an eCall-only subscriber, and
further processing the registration request to ascertain whether to approve or disapprove the registration request based on determining that the registration request is not from an eCall-only subscriber.

14. The apparatus of claim 13, wherein the registration request is received from an in-vehicle system (IVS) via a roaming network.

15. The apparatus of claim 13, wherein the receiving and determining are performed by a home network, and wherein the registration request is received via a roaming network.

16. The apparatus of claim 15, wherein the determining is performed by referencing a Home Location Register (HLR), wherein the HLR includes an indicator designating eCall-only subscribers.

17. The apparatus of claim 15, wherein the determining is performed by referencing an eCall-only list separate from a Home Location Register (HLR).

18. The apparatus of claim 17, wherein the home network provides the eCall-only list on a server accessible by at least one roaming network, the eCall-only list equating to pre-approval to the at least one roaming network to approve a registration request from a subscriber listed on the eCall-only list.

19. The apparatus of claim 17, wherein the home network pushes the eCall-only list to at least one roaming network, the eCall-only list equating to pre-approval to the at least one roaming network to approve a registration request from a subscriber listed on the eCall-only list.

20. The apparatus of claim 13, wherein the receiving and determining are performed by a roaming network that is not a home network for the registration request.

21. The apparatus of claim 20, wherein the determining performed by the processor further comprises:
identifying a home network for approving the registration request;
forwarding the registration request to the home network; and
receiving an indication from the home network that the registration request is approved or disapproved.

22. The apparatus of claim 20, wherein the determining is performed by referencing an eCall-only list provided by a home network, the eCall-only list equating to pre-approval for the roaming network to approve a registration request from a subscriber listed on the eCall-only list.

23. The apparatus of claim 22, wherein the referencing comprises accessing a server on which the home network has provided information pertaining to the eCall-only list.

24. The apparatus of claim 22, wherein the referencing comprises accepting from the home network information pertaining to the eCall-only list that has been pushed from the home network to the roaming network.

25. A non-transitory computer-readable medium comprising instructions that cause a computer to:
receive a registration request;
determine if the registration request is from an eCall-only subscriber;
approve the registration request based on determining that the registration request is from an eCall-only subscriber; and
further process the registration request to ascertain whether to approve or disapprove the registration request based on determining that the registration request is not from an eCall-only subscriber.

26. The computer-readable medium of claim 25, wherein the instructions that cause the computer to receive the registration request further comprise instructions to cause the computer to receive the registration request from an in-vehicle system (IVS) via a roaming network.

27. The computer-readable medium of claim 25, wherein the instructions are executed by a home network, and wherein the registration request is received from a subscriber via a roaming network.

28. The computer-readable medium of claim 27, wherein the instructions that cause the computer to determine comprise instructions to cause the computer to reference a Home Location Register (HLR) that includes an indicator designating eCall-only subscribers.

29. The computer-readable medium of claim 27, wherein the instructions that cause the computer to determine comprise instructions to cause the computer to reference an eCall-only list separate from a Home Location Register (HLR).

30. The computer-readable medium of claim 29, further comprising instructions that cause the computer to provide the eCall-only list on a server accessible by at least one roaming network, the eCall-only list equating to pre-approval to the at least one roaming network to approve a registration request from a subscriber listed on the eCall-only list.

31. The computer-readable medium of claim 29, further comprising instructions that cause the computer to push the eCall-only list to at least one roaming network, the eCall-only list equating to pre-approval to the at least one roaming network to approve a registration request from a subscriber listed on the eCall-only list.

32. The computer-readable medium of claim 25, wherein the instructions are executed by a roaming network, and wherein the registration request is received from a subscriber of a home network that is not the roaming network.

33. The computer-readable medium of claim 32, wherein the instructions that cause the computer to determine further comprise instructions to cause the computer to:
identify a home network for approving the registration request;
forward the registration request to the home network; and
receive an indication from the home network that the registration request is approved or disapproved.

34. The computer-readable medium of claim 32, wherein the instructions that cause the computer to determine further comprise instructions to cause the computer to reference an eCall-only list provided by a home network, the eCall-only list equating to pre-approval for the roaming network to approve a registration request from a subscriber listed on the eCall-only list.

35. The computer-readable medium of claim 34, wherein the instructions that cause the computer to reference further comprise instructions to cause the computer to access a server on which the home network has provided information pertaining to the eCall-only list.

36. The computer-readable medium of claim 34, wherein the instructions that cause the computer to reference further comprise instructions to cause the computer to accept from the home network information pertaining to the eCall-only list that has been pushed from the home network to the roaming network.

* * * * *